E. Z. LEWIS.
ATTACHMENT FOR TYPE WRITERS.
APPLICATION FILED MAY 13, 1914.
1,214,557.
Patented Feb. 6, 1917.
9 SHEETS—SHEET 3.
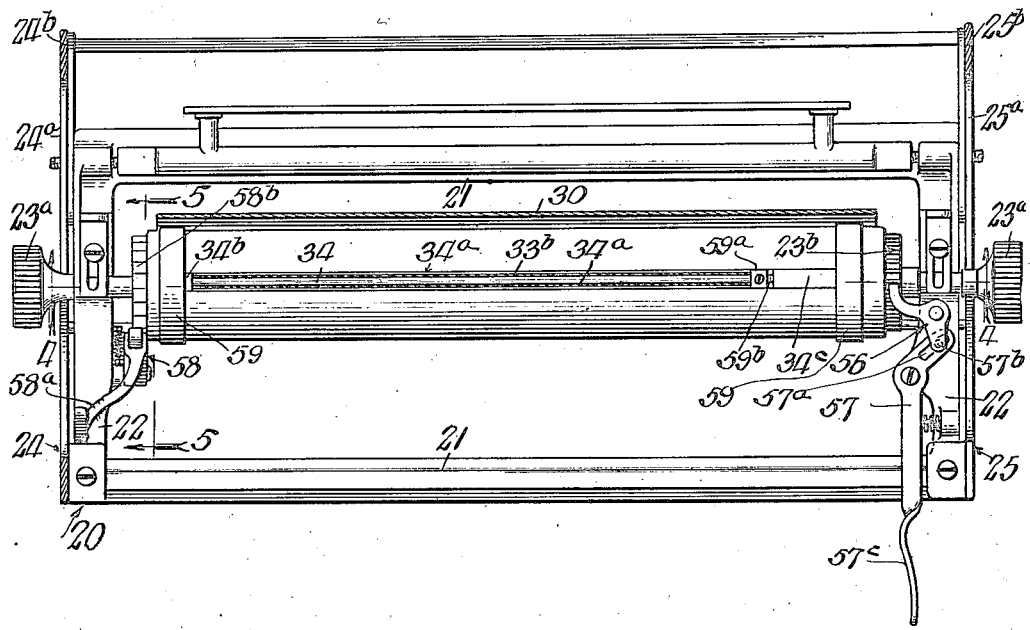
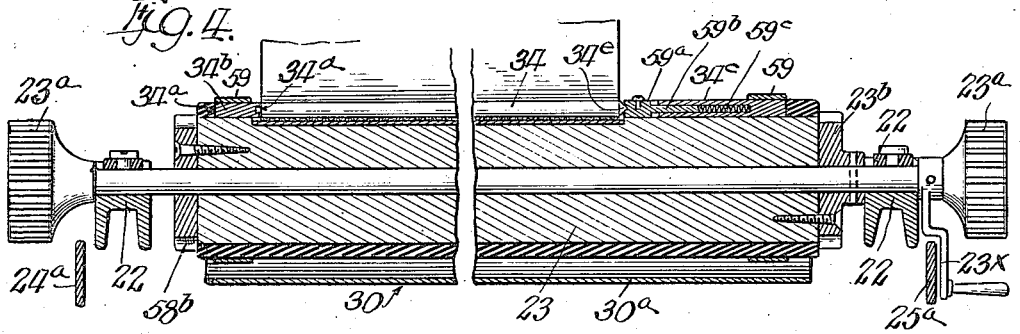
Inventor
Edward Z. Lewis E. Z. LEWIS.
ATTACHMENT FOR TYPE WRITERS.
APPLICATION FILED MAY 13, 1914.
1,214,557.
Patented Feb. 6, 1917.
9 SHEETS—SHEET 4.
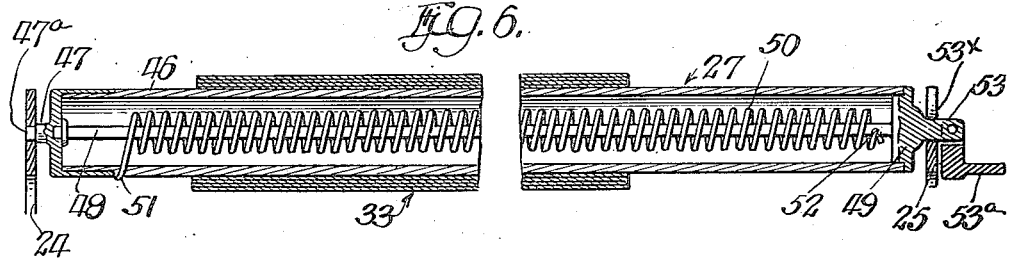
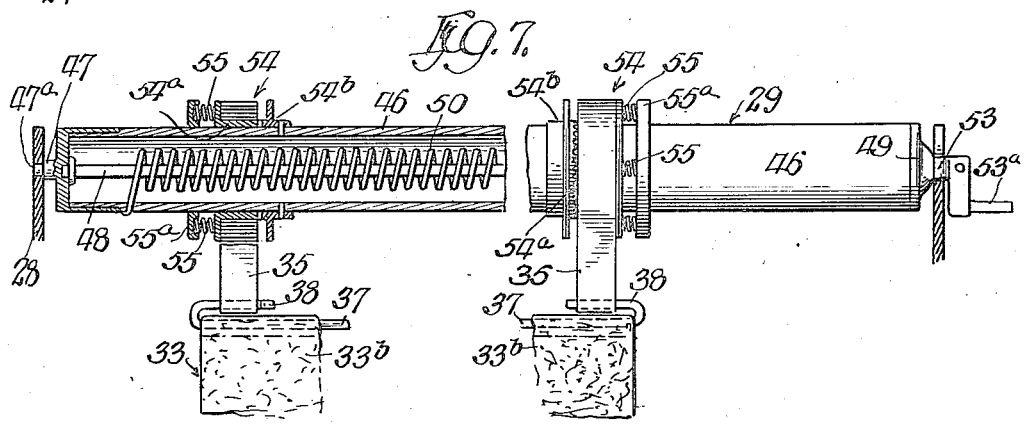
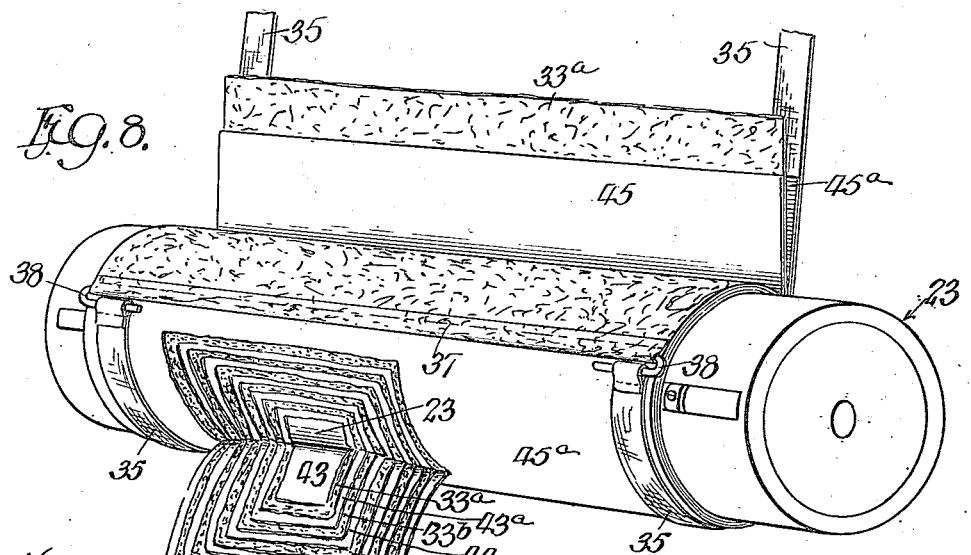

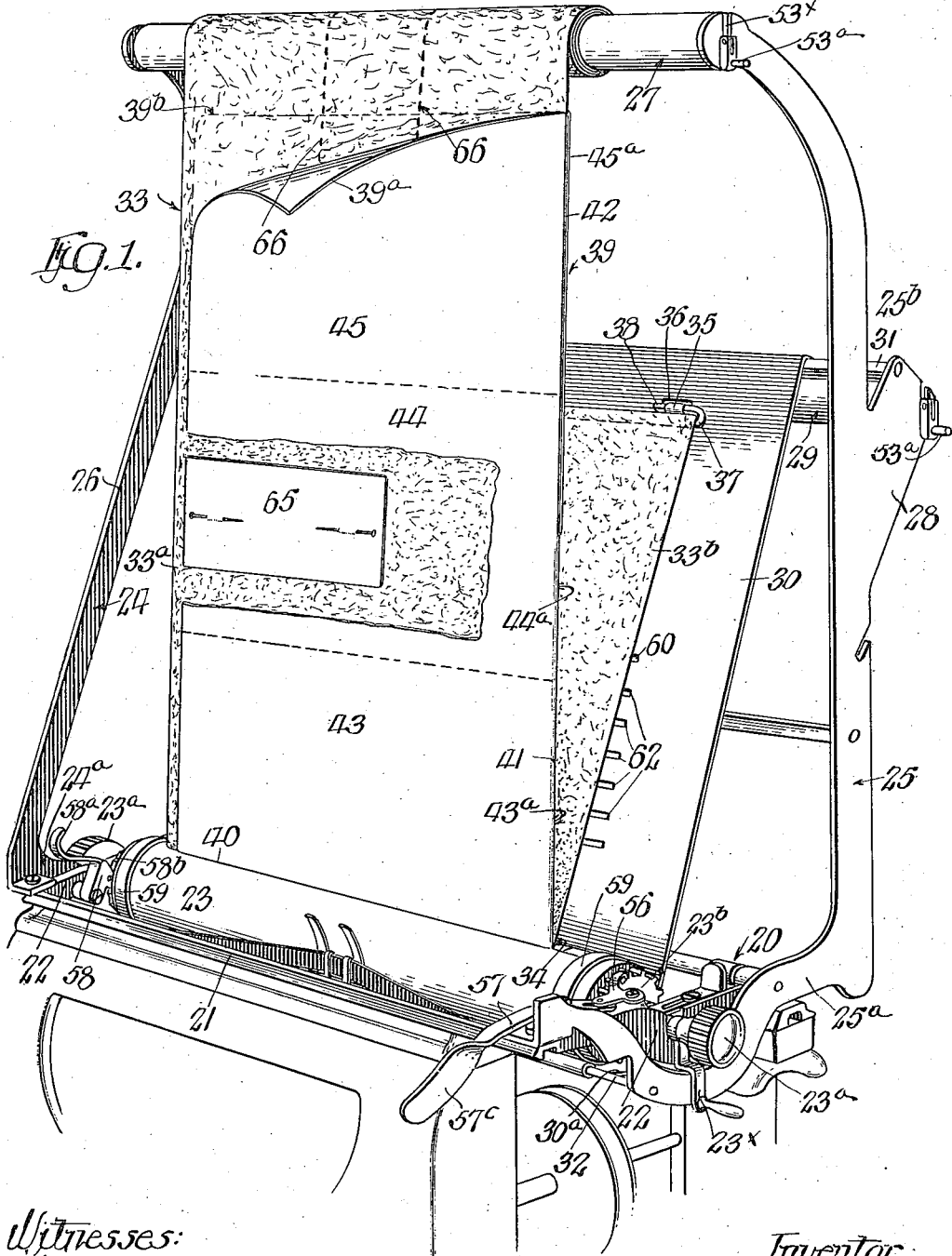

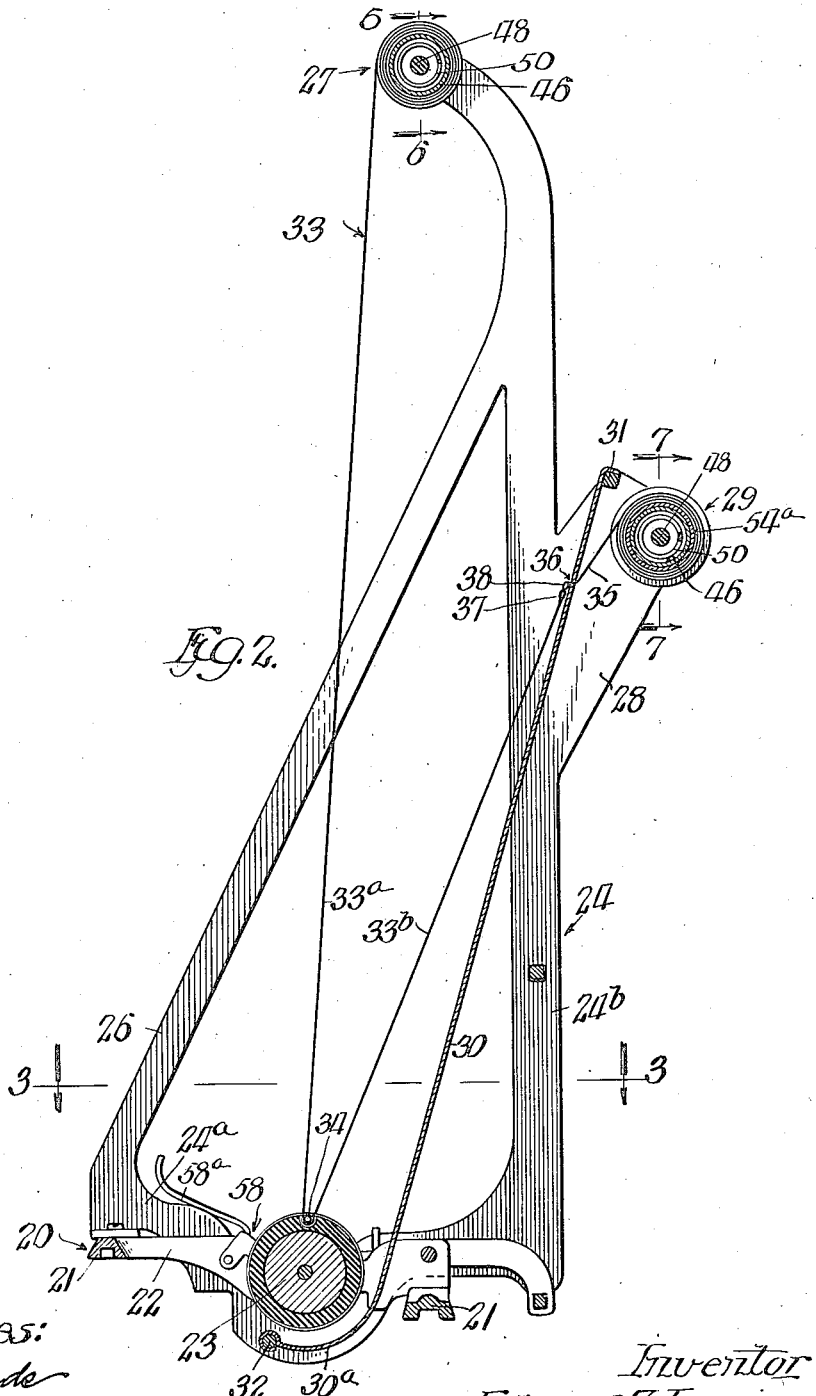

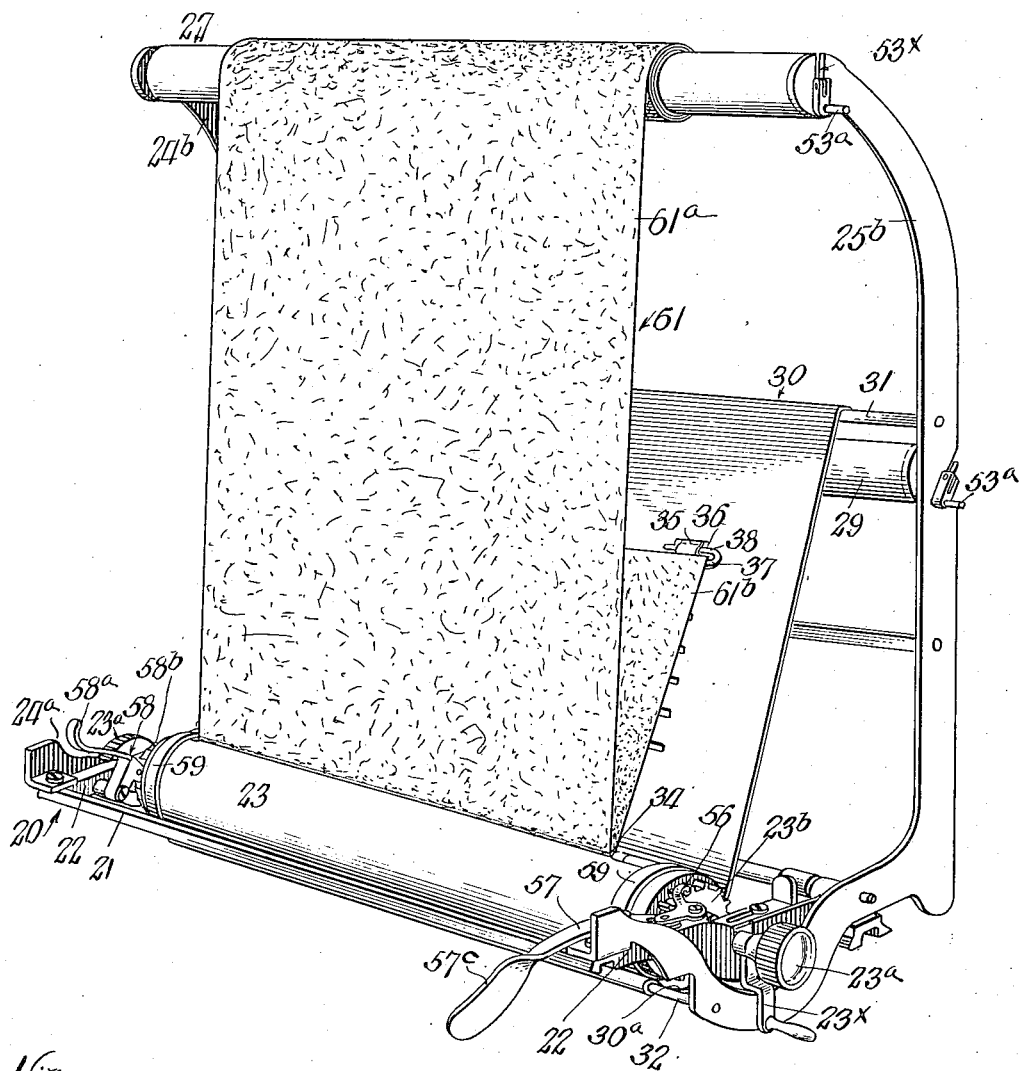

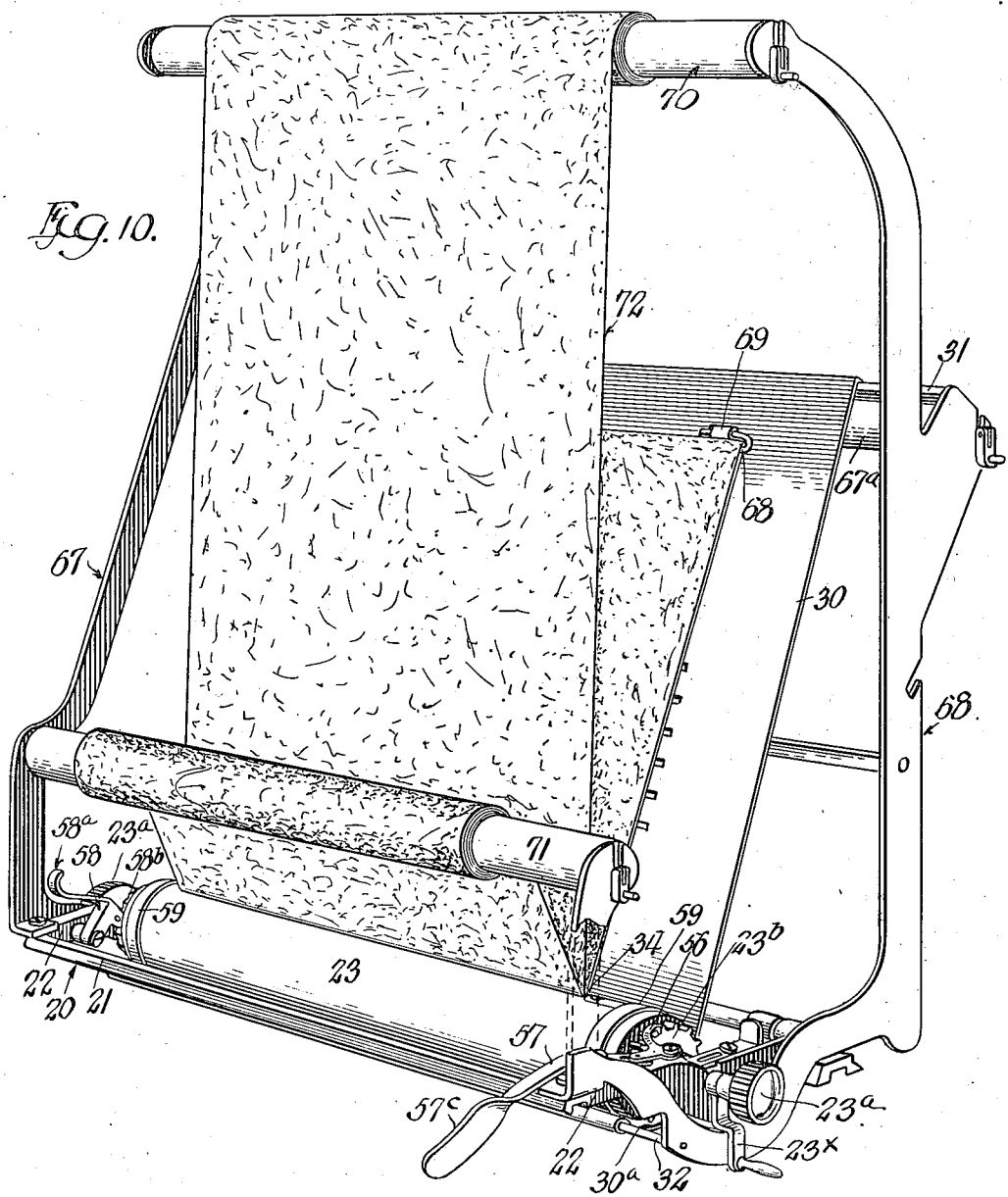

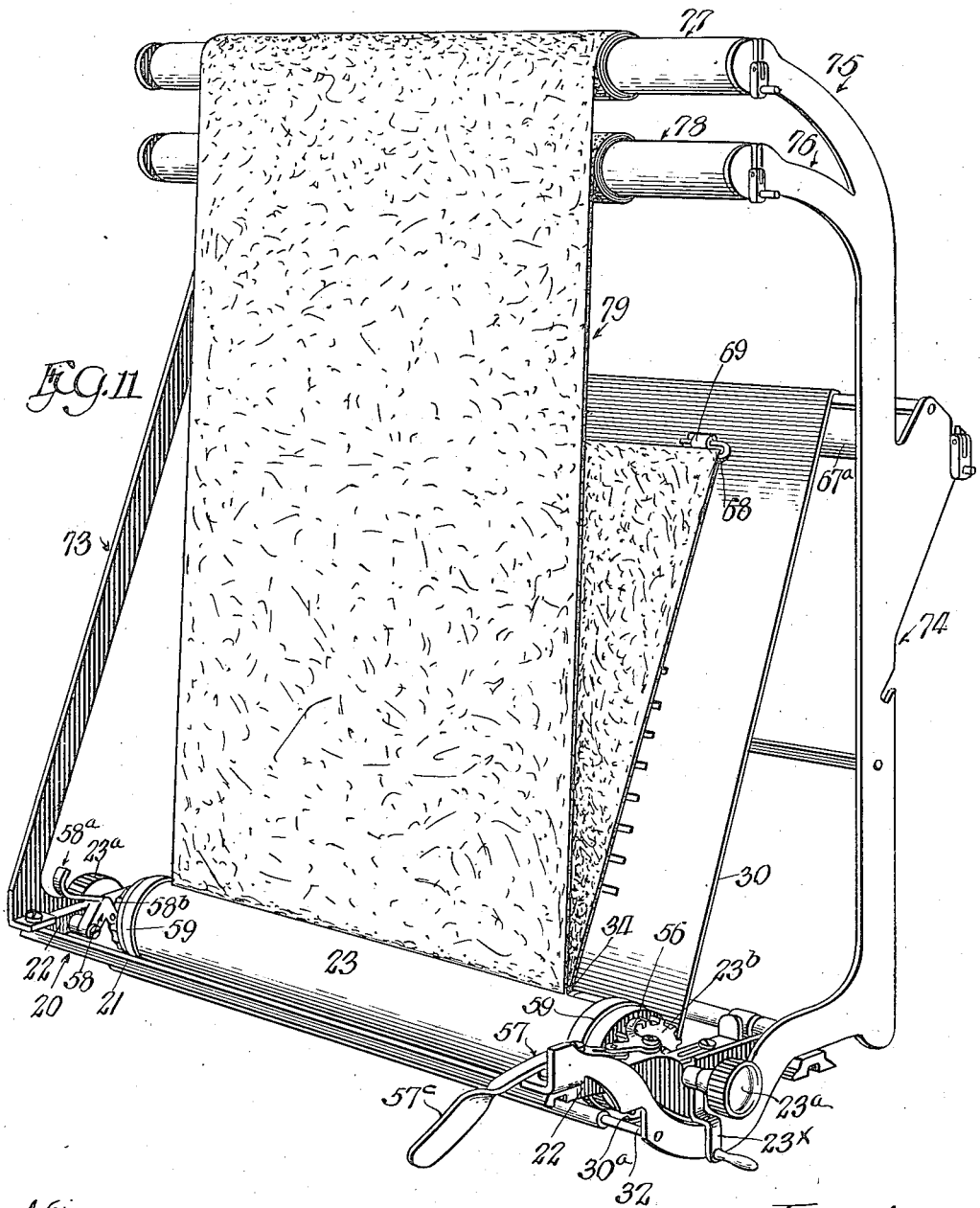

E. Z. LEWIS.
ATTACHMENT FOR TYPE WRITERS.
APPLICATION FILED MAY 13, 1914.
1,214,557.
Patented Feb. 6, 1917.
9 SHEETS—SHEET 8.
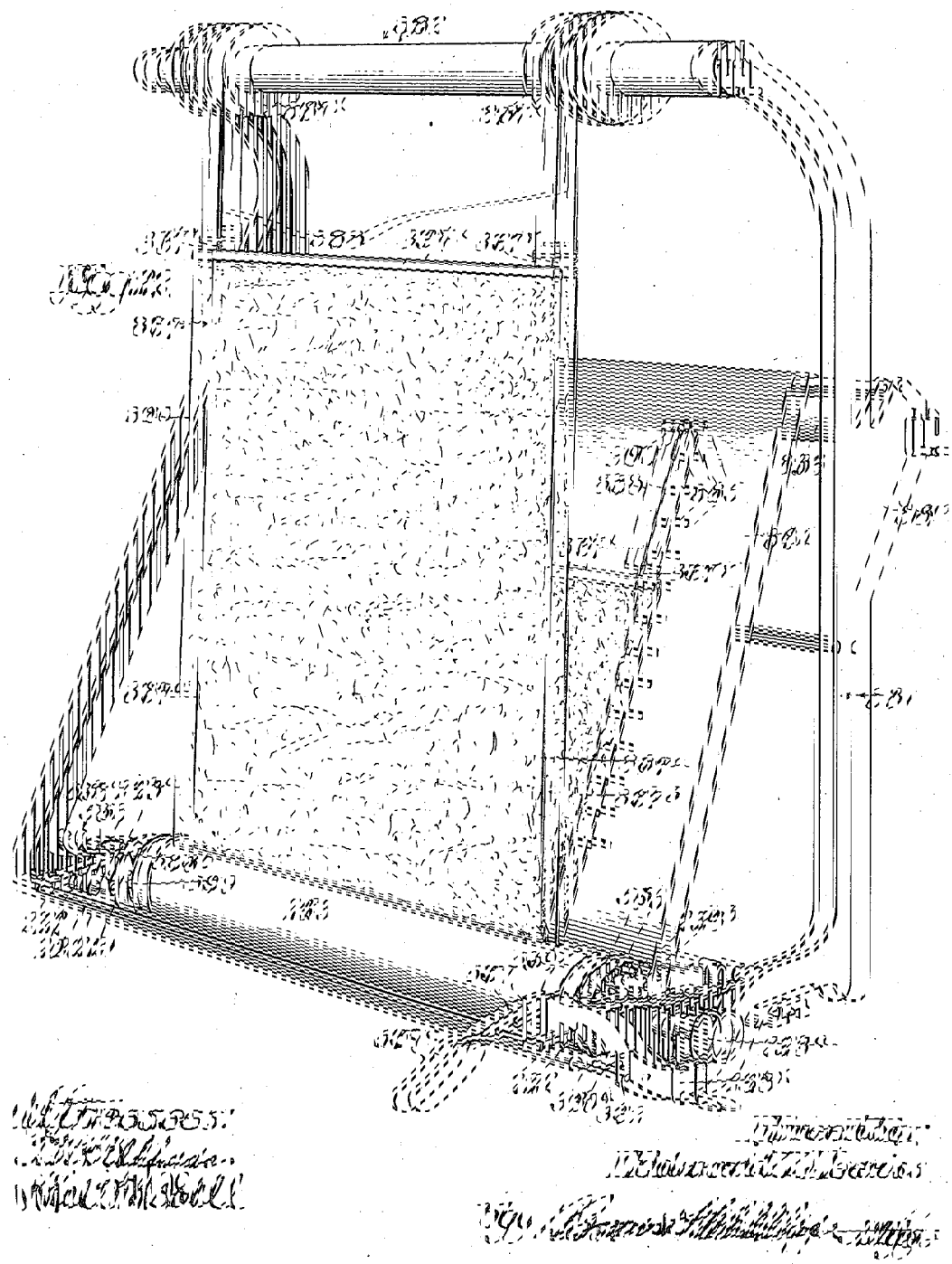

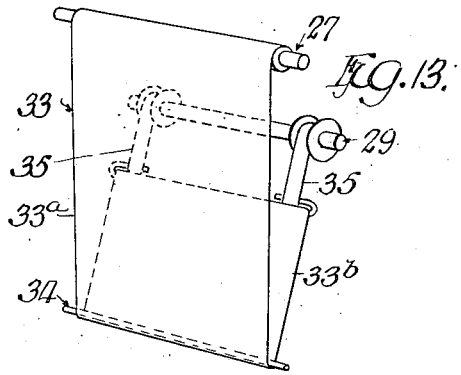
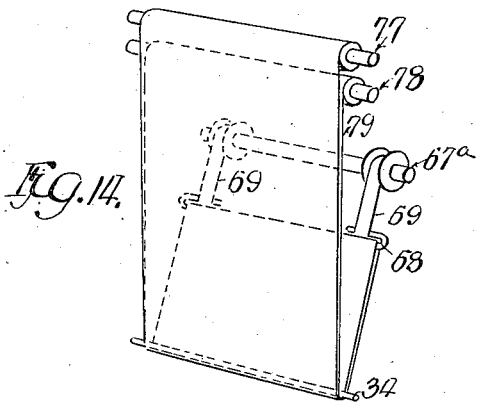
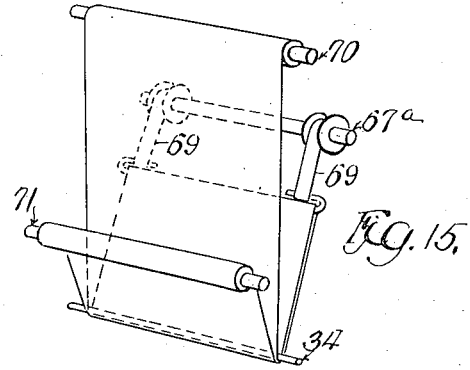
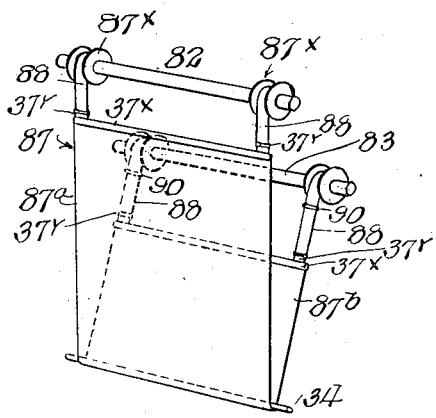
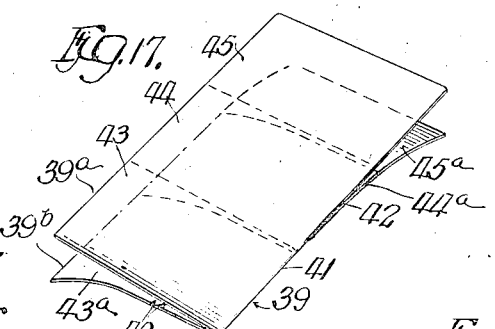

UNITED STATES PATENT OFFICE.

EDWARD Z. LEWIS, OF CHICAGO, ILLINOIS.

ATTACHMENT FOR TYPE-WRITERS.

1,214,557. Specification of Letters Patent. Patented Feb. 6, 1917.

Application filed May 13, 1914. Serial No. 838,236.

*To all whom it may concern:*

Be it known that I, EDWARD Z. LEWIS, a citizen of the United States, and a resident of Chicago, in the county of Cook and State of Illinois, have invented certain new and useful Improvements in Attachments for Type-Writers; and I do hereby declare that the following is a full, clear, and exact description thereof, reference being had to the accompanying drawings and to the letters of reference marked thereon, which form a part of this specification.

This invention relates to an attachment for typewriters adapted for making a plurality of copies, quickly and conveniently, without folding of sheets, inserting of carbons, or jogging or shifting of parts in order to make the copies register, as is necessary in ordinary methods.

The invention consists of the matters hereinafter described and more particularly pointed out in the appended claims.

The attachment is particularly intended for making manifold copies on forms printed on a sheet folded lengthwise and comprising superposed sections, with a plurality of forms, two or more, arranged on each section of the sheet, those of one section being arranged to lie above and register with an associated form on the other section when wound on the platen of a typewriter.

The manifolding sheet designed for use in connection with the typewriter attachment shown and described herein has its folded edge slit from its bottom edge to a point near its top in order that the two sections of the sheet will wind smoothly about the typewriter platen in the manner described in Letters Patent issued to me on the 13th day of February, 1912, No. 1,017,298, relating to a billing sheet.

The invention relates to the class of attachment for typewriting machines described in Letters Patent No. 1,007,581 granted to me on October 31st, 1911, and embodies certain improvements relating to that type of attachment.

In the drawings: Figure 1 represents a perspective view of my improved typewriter attachment shown attached to the paper carriage of a typewriting machine. Fig. 2 is a view representing a vertical central section through the parts as illustrated in Fig. 1. Fig. 3 is a view representing a transverse section through the attachment in a plane indicated by the line 3—3 of Fig. 2. Fig. 4 is a view representing a longitudinal section through the paper carriage in a plane indicated by the line 4—4 of Fig. 3. Fig. 5 is a view representing a partial transverse section through the parts shown in Fig. 3, in a plane indicated by the line 5—5 of Fig. 3. Fig. 6 is a view representing on an enlarged scale a vertical section through one of the ribbon wind rolls in a plane indicated by the line 6—6 of Fig. 2. Fig. 7 is a view representing a vertical section through the other ribbon wind roll in a plane indicated by the line 7—7 of Fig. 2, said roll being shown partially in front elevation. Fig. 8 is a perspective view showing the typewriter platen as it appears when the ribbon and printed form sheet are wound about the platen ready to be written upon, the sections of the printed form sheet and the ribbons being torn away to illustrate the way in which the sections of ribbon and of the printed form fall one upon the other. Fig. 9 is a perspective view similar to Fig. 1 showing the construction designed for making four copies (Fig. 1 illustrating the construction designed for making six copies). Fig. 10 is a view showing a construction designed to make the same number of copies as the attachment shown in Fig. 1, but with a modified arrangement of the ribbon. Fig. 11 shows still another modified arrangement of the ribbon and its supports. Fig. 12 is a perspective view representing a modification of the form of the invention in which the ribbon is attached to tension rolls by tapes at both of its ends. Figs. 13, 14, 15 and 16 are small diagrammatic perspective views, showing the several modified forms of the attachment. Fig. 17 is a perspective view of the type of manifolding sheet designed for use with my improved typewriter attachment.

Referring now to that embodiment of my invention shown in the drawings, and particularly in Figs. 1 to 8, inclusive, 20 indicates the paper carriage of a typewriting machine to which my improved attachment is designed to be connected. The paper carriage may be of any usual construction adapted for use with a typewriting machine, and it is to be understood that my improved attachment may be applied to any of the usual typewriting machines now on the market. The said paper carriage, as shown, comprises a rectangular frame having front and rear bars 21, 21, and transverse end bars 22, 22. 23 indicates the platen, which is mounted in the paper carriage in a familiar manner.

24, 25 indicate upright brackets rigidly secured to the end bars 22 of the paper carriage frame 20. Each bracket consists of a horizontal bar, $24^a$, $25^a$, respectively, by means of which it is attached to the end bar of the paper carriage and an upright bar, $24^b$, $25^b$, respectively, which rises from the rear side of the paper carriage. The one bracket bar $24^a$ is braced in its connection with the carriage frame by means of an inclined bar 26 running from a point near the front of the carriage to a point near the upper end of the said bar $24^b$. The other bracket bar 25 has no such brace bar so that plenty of room is provided for the insertion of the manifolding sheet in a manner presently to be described.

As shown in the drawings (Figs. 1 and 2), the bracket bars $24^b$, $25^b$, are curved forwardly toward the vertical plane containing the longitudinal central axis of the platen and carry at their upper ends a spring controlled roll 27. Said bracket-bars are provided intermediate their ends with rearwardly inclined arms 28, which carry a second spring controlled roll 29. 30 indicates a plate or shield of a width substantially equal to the length of the platen 23. Said shield is attached at its upper end to a bar 31 carried by the rearwardly inclined bracket arms 28 in a position forward of and above the spring controlled roll 29 and extends downwardly at the rear of the platen. The shield has a part $30^a$ which extends below and is curved about, but spaced from, the platen (as clearly shown in Fig. 2), and is attached to a rod 32 carried by the horizontal bars $24^a$, $25^a$ of the brackets 24, 25.

Upon the spring controlled roll 27 is wound a carbon ribbon 33. Said ribbon, as shown in Fig. 2, passes downwardly from the spring controlled roll 27 to the platen where it is looped about a small roll or rod 34, mounted in the surface of the platen. From there it passes upwardly and rearwardly toward the spring controlled roll 29 to which it is connected by means of laterally spaced tapes 35, which are wound upon said spring controlled roll 29. The roll or rod 34 on the platen thus divides the carbon ribbon, where a continuous ribbon is used, into two sections, that is to say, a front section $33^a$ and a rear section $33^b$. The rear section $33^b$ is placed immediately in front of the plate or shield 30 and the tapes 35 which connect said rear section to the spring controlled roll 29 extend through slots 36 in the plate 30. The said tapes 35 are connected to the upper end of the short ribbon section $33^b$. The rod 37, as I have illustrated it in the figures of the drawings referred to, is placed in a tuck or loop at the end of the ribbon. The function of the rod 37 is to keep the ribbon in horizontal tension so it will not bulge or wrinkle.

Other means may be used for attaching the ribbon to the tapes 35. In Fig. 12 (to be referred to later) is shown an end plate $37^x$ clamped to the end of the ribbon, making the tuck unnecessary, and I do not limit myself to any specific means for holding the end of the ribbon taut or to any specific means for attaching tapes to the lateral edges of the ribbon.

The rod 37 is bent upon itself at the ends to form lugs or hooks 38 to which the ends of the tapes 35 are attached. Said lugs or hooks under the tension of the tapes 35 are normally held in engagement with the front face of the plate or shield 30 which thus acts as a stop to limit the movement of the ribbon section $33^b$ under the pull of the tapes, the front section, as shown, being longer than the rear section $33^b$. When the platen is wound in the usual manner, clockwise as it appears in Fig. 2, the shorter ribbon section $33^b$ will be wound upon the longer ribbon section $33^a$. Thus when a manifolding sheet of the kind described, that is to say, a sheet folded lengthwise to form front and rear sections, each section being printed with a plurality of corresponding like printed forms, is placed with its top edge against the platen and with two sections of the overlapping sheet embracing the front ribbon section $33^a$, as illustrated in Fig. 1, the front ribbon section $33^a$ is capable of being wound with the sheet about the platen a greater number of turns than the rear section of the ribbon.

In Fig. 1 (see also Fig. 17), 39 indicates a manifolding sheet of the kind above referred to, which is folded longitudinally to form a section $39^a$ and a section $39^b$, the latter being the front section of the folded sheet.

40 indicates the top end of the sheet which is brought against the platen as described in the patents hereinbefore referred to, when the sheet is to be wound on the platen. The printing on the sheet, when in the position shown in Fig. 1, is upside down. Thus the rear section $39^a$ of the sheet is in front and the front section $39^b$ is back of the longer ribbon section $33^a$.

42 indicates the slit in the folded edge 41 of the manifolding sheet. The manifolding sheet sections are provided respectively with printed forms 43, 44, and 45, and $43^a$, $44^a$ and $45^a$, and the respective forms 43, 44 and 45 are adapted to be superposed upon the forms $43^a$, $44^a$ and $45^a$ when the sheet is wound upon the platen and the several forms are of a vertical height such that when wound with the ribbon on the platen each will constitute a single, complete winding about said platen.

When the manifolding sheet is placed as described and as clearly shown in Fig 1, and the platen is rotated to wind the ribbons with the manifolding sheet upon the platen, the form 43 of the back section of the sheet falls next to the surface of the platen (see Fig. 8), then comes the interposed part of the longer ribbon section 33ᵃ and then the form 43ᵃ of the front section of the sheet. Next to this lies a part of the shorter ribbon section 33ᵇ. Then come in succession as named the form 44, a part of the longer ribbon section 33ᵃ, the form 44ᵃ and the end part of the shorter ribbon section 33ᵇ. Then come in the next winding of the platen (which winding is produced as the writing is produced by the typewriter on the form 45ᵃ), the form 45, a part of the longer ribbon section 33ᵃ and the form 45ᵃ. The shorter ribbon section 33ᵇ, as shown in Fig. 1 is made of such length that it may be wound but twice about the platen, that is to say, its length is substantially twice the length of the circumference of the platen. Thus said ribbon section is not included in the third winding of the platen. It is manifest from this description of the winding that the form 45ᵃ will be presented to be written upon by the type of the typewriter and that the matter written upon this form will be reproduced on each and every one of the other forms on the manifolding sheet and the six copies will be made at one writing.

It is also obvious from this description that the writing space is provided on the outer section of the superimposed parts of the form sheet because of the predetermined shorter length of the ribbon section 33ᵇ and is included between the tapes 35.

Fig. 8 illustrates the location of the different forms when ready to be written upon, and the location of the writing space on the sheet. The last, or bottom two printed forms of the folded sheet are superimposed on the other sections when wound around the platen, and the writing space begins where the shorter ribbon ends and from that point to the bottom of the sheet, between the tapes. The longer ribbon provides carbon means for copying the writing on all three forms comprising the bottom section of the folded printed sheet, and the shorter ribbon provides carbon means for copying the writing on the upper two forms on the top section of the folded printed sheet.

The tension rolls 27 and 29 may be of any usual or convenient construction, and are preferably of the general type of shade rolls. Said tension rolls are illustrated in detail in Figs. 6 and 7. Each roll comprises a barrel 46 having a closed end 47 provided with a stud shaft 47ᵃ rotatively mounted in the bracket 24, and a rod 48 rotatively mounted at one end in the closed end 47 of the barrel and having fixed to its other end a cap 46 which closes and is rotatively mounted with respect to the other, that is to say, the open end of the barrel 46. The rod is placed in the longitudinal, central axis of the barrel, and a coiled spring 50 on the rod has one end 51 engaged with the barrel and the other end 52 engaged with the rod. The cap 49 is provided with a squared stud 53 which engages in an open slot 53ˣ in the bracket arm 25. Preferably, the squared stud 53 has fixed to it a crank arm 53ᵃ for rotating the rod to produce tension in the roll.

The tapes 35 are preferably wound on spools 54, mounted on the barrel 46 of the tension roll 29. Said spools are as shown made in two parts,—the part 54ᵃ comprising a flanged sleeve loosely mounted on the barrel 46 and a part 54ᵇ, consisting of a flanged ring fixed to the barrel 46. The proximate edges of the sleeves of the part 54ᵃ and the ring 54ᵇ are provided with ratchet teeth which are held in yielding engagement by means of springs 55 interposed between the loosely mounted part 54ᵃ of the spool and a ring 55ᵃ fixed on the barrel in such manner as to provide a ratchet action between the two parts of the spool. This construction provides for independent adjustment of the two tapes 35 with reference to the barrel so as to properly locate the rod 37 in parallel relation with the axis of the tension roll 29.

I provide any suitable mechanism for feeding the platen one or more line spaces when the data is being typed on the original form of the manifolding sheet, and in Fig. 3, I have shown in detail a suitable device for this purpose. The platen 23 is provided at its ends with the usual turning knobs 23ᵃ. One of them, as shown, the one at the right hand end of the platen, has fixed to it a crank handle 23ˣ, for convenience in winding the paper and ribbon sections on the platen. The right hand end of the platen has fixed to it a ratchet wheel 23ᵇ.

56 indicates a pawl pivotally mounted to swing in a horizontal plane on the right hand end bar 22, of the paper carriage frame adjacent to and in a position for engagement with the ratchet teeth of the ratchet wheel 23ᵇ. 57 indicates a lever, also pivotally mounted on the same end bar 22 of the paper carriage frame, and operatively connected by a slot and pin connection 57ᵃ, 57ᵇ, in a familiar manner so as to actuate a pawl to rotate the ratchet. Said lever 57 extends forwardly beyond the paper carriage frame, where it is provided with a thumb finger piece 57ᶜ, for grasping it.

The platen is prevented from rotating backward under the pull of the ribbon sections due to the tension of the tension rolls 27 and 29 by means of any suitable spring controlled retaining pawl 58 (see Fig. 5), which engages with a ratchet wheel 58^b fixed to the left hand end of the platen. The retaining pawl is provided with a finger piece 58^a for releasing said pawl from engagement with its ratchet wheel.

The roller or rod 34, about which the ribbon 33 is looped is mounted in the surface of the platen substantially as described in patents heretofore granted to me and referred to above. A convenient construction is shown in Fig. 4. The platen 23 is provided in its surface with a longitudinally extending slot 34^a, and in the ends of said slot are fixed bars 34^b, 34^c, respectively. Said bars are held in place by suitable bands 59, 59. The rod 34 has a reduced end 34^d which is rotatively mounted in the bar 34^b and has a conical end 34^e which engages in a conical recess in an auxiliary block 59^a. Said auxiliary block 59^a has a reduced part 59^b which has reciprocatory bearing in a recess in the block 34^c and is held in yielding engagement with the conical end of the rod 34 by means of a coiled spring 59^c. Manifestly, by moving the auxiliary bar 59^a toward the block 34^c, the rod 34 may be removed to loop the ribbon about it. The only occasion for removing the bar is when a new ribbon is to be adjusted. The free movement of the ribbon around the bar does not allow it to interfere with the shift.

In order that the attachment shown in Fig. 1 may be used to fill out a manifolding sheet having only four printed forms, instead of one having six as shown, I provide the following construction. The shield 30 is provided with a pair of laterally spaced slots 60 corresponding to the slots 36 already mentioned and each in vertical alinement with one of the slots 36 but spaced below the same. The slots 60 are so located with reference to the platen 23, that if the tapes 35 are threaded through said slots and connected to the end of a ribbon section attached to the platen as in the case of the slots 60, said ribbon section will be equal in length to the length of the circumference of the platen.

To adjust the attachment for filling out a manifolding sheet with only four forms, the tapes 35 are detached from the hooked ends 38 of the rod 37 and are withdrawn from the slots 36. Said tapes are then threaded through the slots 60 and again attached to the hooked ends of the rod 37, the ribbon 33 being adjusted by permitting it to wind on the spring roll 27 until the shorter section 33^b is reduced to the proper length. This completes the adjustment and the attachment is now ready for use in connection with a billing sheet having only four forms. It is preferable to provide additional notches 25^x in the brackets 25 (see Fig. 1) to receive the tension roll 29 when this adjustment is made, so as to bring the tension roll nearer the end of the rear ribbon section. Manifestly when the manifolding sheet is now wound with the ribbons about the platen, the shorter ribbon section will only be wound once about the platen, which is all that is required when only four copies are to be made. The operation is otherwise the same as before.

Where the larger part of the work to be done in any office requires only four copies, the attachment may be reduced in size, since the shorter ribbon section is only required to be equal to one (or a part of one) circumference length of the platen and in Fig. 9, I have shown an attachment designed for such work. In said figure, 61 indicates the ribbon as a whole, 61^a, 61^b, respectively, the front longer ribbon section and the rear shorter ribbon section. The other parts of the attachment are substantially the same except that the upright bracket bars 24, 25, are shorter and the like parts are indicated by the same numerals heretofore used.

It may be desirable in the use of the attachment to omit on one or more of the copies certain of the written matter that is to appear on the other copies and my improved attachment offers peculiar facilities for doing this. In the shield 30, I provide a plurality of pairs of laterally spaced slots 62 corresponding to the slots 36 and arranged at regularly spaced vertical intervals below and in vertical alinement with said slots 36. As has been pointed out in connection with the description of the winding of a manifolding sheet having six forms, the upper half of the shorter ribbon section 33^b is wound upon the form 44^a and produces the copy written thereon. Now if it is desired to omit on the lower part of the form 44^a the matter printed on the lower parts of the other forms, the tapes may be threaded through one or the other of the pairs of slots 62 spaced below the slots 36 a sufficient distance to permit the shorter ribbon section to be reduced in length such an amount that when wound with the manifolding sheet, it will fall short of covering the lower part of the form 44^a that is not to be written upon. Then when that part of the original written upon the form 45^a is typed, since there is no carbon ribbon covering the corresponding part of the form 44^a, the matter written on the original and reproduced on the other forms will not be reproduced on the form 44^a.

In case matter is to be omitted on parts of other forms, a blank or sheet of paper 65 of the necessary size may be pinned or in any way attached to the part of the ribbon section that would otherwise transfer to the part of the form covered by said blank, and the matter written on the original at the place corresponding to the place on the copy covered by the blank 65 will not appear on said copy. The many advantages of this feature of the improvement will be manifest to those familiar with the art. Again, supposing that it is desired to leave out on the copies the matter written in a vertical column or columns on the original form. This may be readily done in the use of my improved attachment by providing the ribbon 33 with a longitudinally extending section, as indicated by the dotted lines 66 in Fig. 1, in which the carbon material is omitted from the ribbon. Then, when the matter is typed on the original form 45$^a$, the matter typed thereon in the column space included between the lines 66 of the ribbon will not be reproduced on the forms 45, 44, 43, 44$^a$ and 43$^a$. Instead of a blank space being included on the ribbon between the lines 66, the ribbon may be of a different color in the space between these lines, in which case the matter typed on the original form 45$^a$ in the space included between said lines 66, will appear on the copies in a different color from that of the other matter appearing on the copies.

Various means may be employed to shift or change the ribbon so as to prevent the type of the typewriter from always striking in the same place. In the construction shown in Figs. 1, 2 and 9, as the ribbon is simply looped about the rod or roll 34, the ribbon may be from time to time changed to present a fresh surface to the type by simply drawing the ribbon forwardly and upwardly toward the rod 37. In Figs. 10 and 11, I have shown other arrangements of the ribbon which provide more conveniently for the feed of the ribbon in order to renew the ribbon surface presented to the type of the typewriter.

Referring first to the construction shown in Fig. 10,—67, 68 indicate the bracket arms arising from the paper carriage, as before, said bracket arms being of substantially the same construction. 67$^a$ indicates a tension roll corresponding to the tension roll 29, in the machine shown in Fig. 1, 68, the rod to which the shorter section of the ribbon is to be attached, and 69, 69, the tapes by which the said shorter section is connected to the tension roll 67. 70 indicates a tension roll carried at the top of the bracket arms 67, 68, and 71, a second tension roll carried by said bracket arms in a position shortly above and slightly forward of the platen 23. 72 indicates a ribbon, one end of which is wound upon the tension roll 70, and the other end of which is wound upon the tension roll 71. Said ribbon is looped about the rod 68, thus doubling it upon itself and then the two sections of ribbon thus formed are threaded under the rod or roll 34 mounted in the surface of the platen, as heretofore. In this case, the shorter ribbon section is made in two thicknesses. The ribbon, however, may be easily shifted to renew the surface presented to the type by simply unwinding from one tension roll 70 and winding it upon the other tension roll 71. In this case, the one part of the ribbon, namely, that coming from the tension roll 71, will be wound on the platen in contact with the back section of the manifolding sheet, but this will be of no moment, and will not interfere with the proper operation of the attachment. This construction provides means for making an extra copy, as when a card index is made. The card may be wound on the platen between the part of the ribbon connected to the roll 71 and the part of the ribbon connected to the roll 70.

In Fig. 11, I have shown another modification. In this case, 73, 74 indicate the upright brackets which are each provided at their upper ends with forwardly projecting arms 75, 76. 77, 78 indicate tension rolls located one above the other with their axes in a vertical plane. 79 indicates the ribbon, one end of which is wound upon the tension roll 78 and the other end of which is wound upon the tension roll 77. The two thicknesses of the ribbon are carried under the rod 34 in the platen and are looped about the rod 68, which is connected by the tapes 69 to the rear tension roll 67$^a$, as in the case last described. In this case, the longer front ribbon section, as well as the rear shorter ribbon section, both comprise two thicknesses of ribbon. The surface of the ribbon presented to the type is renewed as before by unwinding the ribbon from one tension roll 78 and rewinding it on the other.

In Fig. 12, I have shown a modification of the invention in which both the front, longer ribbon section, and the rear, shorter ribbon section, are attached by marginal tapes to their respective tension rolls. The means by which the ends of the ribbon are attached to their respective tapes has been referred to supra, the same consisting of metal plates 37$^x$ clamped or in other manner attached to the ribbon ends, so as to hold said ribbon ends stretched in a lateral direction. Said plates are provided with clips 37$^y$ at their ends, which are preferably made by cutting a part out of the plates themselves and bending them up into proper form.

In Fig. 12, 80, 81 indicate the brackets secured to the paper carriage frame, as hereinbefore described, and 82, 83, the tension rolls to which are attached respectively the front longer ribbon section and the rear shorter ribbon section. 87 indicates the ribbon as a whole, and 87$^a$, 87$^b$, respectively, the front and rear ribbon sections. 88 indicates tapes attached to the upper end of the forward ribbon section 87ª and wound upon spools 87ˣ, 87ˣ on the tension roll 82, in the way heretofore described in connection with the rear tension roll, for connection with the rear ribbon section.

I have shown in Fig. 12, a way of predetermining the relative lengths of the longer and shorter ribbon sections, and also of predetermining the length of the shorter ribbon section. 90 indicates detachable clips which may be attached to the tapes at any point. These clips are made of such size that they will arrest the movement of the tapes when they strike the shield, which is indicated at 84.

Manifestly, by adjusting the position of the clips 90 on the tapes which connect the rear shorter ribbon section to its associated tension roll 83 and also the relative tension of the tension rolls 82, 83, the length of the shorter ribbon section 87ᵇ and the relation as to length of the two ribbon sections 87ª and 87ᵇ may be adjusted. For example, the rear ribbon section may be so adjusted as to omit on the lower part of the form on which it produces the copy, a part of the matter typed on the original form, and in like manner, the front longer ribbon section may be adjusted so as to omit on the form on which it produces the copy, a part of the matter typed at the top of the original form. The way in which the two ribbon sections may be adjusted as described will be apparent to those familiar with the art.

The modification shown in Fig. 12 discloses another way in which the ribbon may be shifted to renew the ribbon surface for the type. Manifestly, but a slight shift of the ribbon is required in order to prolong the life of the ribbon, and as will be readily understood, by adjusting the clips 90 on the tapes connecting the rear ribbon section with the associated tension roll, a slight shift of the ribbon may be made without materially changing the relative lengths of the two ribbon sections.

In addition, as in the kind of work intended to be performed on this sort of a typewriter attachment, there is apt to be more writing on one side of the form than on the other, the ribbon may be renewed, by detaching it at its ends from the respective tapes, and simply reversing it. Again, it may be renewed by detaching it and reversing it end for end.

Instead of a carbon ribbon, a carbon paper or a sheet or strip of any other carbonized material which is of sufficiently strong texture to withstand the required tension, may be used. It will thus be understood therefore, that my invention is not limited to the use of carbon ribbon, and while in the claims the term "carbon ribbon" is used, said term is used generically and is intended to include any material of a like character, capable of performing the function of the carbon ribbon.

While in describing my invention, I have referred to many details of construction and arrangement, and to various modifications of the form in which my invention may be embodied, it is to be understood that the invention is in no way limited thereby, and that the mechanical form, construction and arrangement may be changed in many ways without departing from the spirit of my invention.

I claim as my invention:

1. In a typewriting machine, a platen, and two carbon ribbon sections, said ribbon sections having an end attached to the periphery of the platen along a common longitudinal line thereof, said ribbon sections being adapted to be wound in superposed relation, one upon the other, and the one wound next to the platen being longer than the other.

2. In a typewriting machine, a platen, and two carbon ribbon sections, said carbon ribbon sections each having an end attached to the periphery of the platen along a common longitudinal line thereof, said ribbon sections being adapted to be wound in superposed relation, one upon the other, the one wound next to the platen being longer than the other, and means for varying the length of the shorter carbon ribbon section.

3. In a typewriting machine, a platen, and two carbon ribbon sections, said carbon ribbon sections having an end attached to the periphery of the platen along a common longitudinal line thereof, said ribbon sections being adapted to be wound in superposed relation, the one upon the other, the one wound next to the platen being longer than the other, and means for predetermining the relative lengths of said ribbon sections.

4. In a typewriting machine, a platen, two carbon ribbon sections, said ribbon sections having an end attached to the periphery of the platen along a common longitudinal line thereof, said ribbon sections being adapted to be wound in superposed relation, the one upon the other, the one wound next to the platen being longer than the other, and mechanism for each ribbon section, adapted to produce tension therein.

5. In a typewriting machine, a platen, two carbon ribbon sections, said ribbon sections having an end attached to the periphery of the platen along a common longitudinal line thereof, and being adapted to be wound in superposed relation, the one upon the other, upon said platen, the one wound next to the platen being longer than the other, mechanism for each ribbon section, adapted to produce tension therein, and means for varying the length of the shorter ribbon section.

6. In a typewriting machine, a platen, two carbon ribbon sections, said ribbon sections having an end attached to the periphery of the platen along a common longitudinal line thereof, and being adapted to be wound in superposed relation, the one upon the other, upon said platen, the one wound next to the platen being longer than the other, mechanism for each ribbon section, adapted to produce tension therein, and means for adjusting said ribbon sections to predetermined relative lengths.

7. In a typewriting machine, a platen, a rod or roll in the surface of said platen, a carbon ribbon looped about said rod or roll to form two ribbon sections adapted to be wound in superposed relation, the one upon the other, upon said platen, the ribbon section next to the platen being longer than the other section, mechanism for each ribbon section adapted to produce tension therein, and means for predetermining and for maintaining the relative lengths of said two ribbon sections.

8. In a typewriting machine, a platen, a rod or roll in the surface of said platen, a carbon ribbon looped about said rod or roll to form two ribbon sections, adapted to be wound in superposed relation, the one upon the other, upon said platen, the ribbon section wound next to the platen being longer than the other section, means for producing tension in said ribbon sections, means for predetermining the relations of said ribbon sections as to length and for maintaining said length relations, and means for shifting said ribbon to renew the surface presented to the type, while still maintaining the said predetermined length relations of said ribbon sections.

9. In a typewriting machine, a platen, a rod or roll in the surface of said platen, a carbon ribbon looped about said rod or roll to form two ribbon sections, adapted to be wound in superposed relation, the one upon the other, upon said platen, the ribbon section wound next to the platen being longer than the other, the longer ribbon section being of a length to be wound a whole turn about the platen more than the shorter ribbon section, and means for maintaining said ribbon sections in their predetermined relations as to length.

10. In a typewriting machine, a platen, two carbon ribbon sections, said ribbon sections having an end attached to the periphery of the platen along a common longitudinal line thereof, said ribbon sections being adapted to be wound in superposed relation, the one upon the other, upon said platen, the ribbon section wound next to the platen being longer than the other ribbon section, and the longer ribbon section being of a length to be wound a whole turn about the platen more than the shorter ribbon section.

11. In a typewriting machine, a platen two carbon ribbon sections, said ribbon sections having an end attached to the periphery of the platen along a common longitudinal line thereof, said ribbon sections being adapted to be wound in superposed relation, the one upon the other, upon the platen, the one wound next to the platen being longer than the other, mechanism on each ribbon section adapted to produce tension therein, and marginal tapes attached to the end of the shorter ribbon section, adapted for connecting it to its associated tension mechanism.

12. In a typewriting machine, a platen, a rod or roll on the surface of said platen, a carbon ribbon looped about said rod or roll to form two ribbon sections, adapted to be wound in superposed relation, the one upon the other, upon the platen, the one wound next to the platen being longer than the other, tension rolls located above but carried with said platen, one for each ribbon section, and laterally spaced tapes, adapted for attaching the shorter ribbon section to its associated tension roll.

13. In a typewriting machine, a platen, a rod or roll in the surface of said platen, a carbon ribbon looped about said rod or roll to form two ribbon sections, adapted to be wound in superposed relation, the one upon the other, upon the platen, the one wound next to the platen being longer than the other, tension rolls located above but carried with said platen, one for each ribbon section, laterally spaced tapes, adapted for connecting the shorter ribbon section to its associated tension roll, and means for predetermining and for maintaining the relative lengths of said ribbon sections.

14. In a typewriting machine, a platen, a rod or roll in the surface of said platen, a carbon ribbon looped about said rod or roll to form two ribbon sections, adapted to be wound in superposed relation, the one upon the other, upon said platen, the one wound next to the platen being longer than the other, tension rolls located above but carried with said platen, one for each ribbon section, laterally spaced tapes, adapted for connecting the ends of said ribbon sections to their associated tension rolls, and means for predetermining and for maintaining the relative length relations of said ribbon sections.

15. In a typewriting machine, a platen, a carbon ribbon adapted to be wound about said platen in two sections, the one section superposed upon the other when thus wound, the ribbon section wound next to the platen being longer than the other, means for producing tension in said ribbon sections, and means for predetermining and for maintaining the relative length relations of said ribbon sections.

16. In a typewriting machine, a platen, a carbon ribbon adapted to be wound about said platen in two sections with the one section superposed upon the other section, the one wound next to the platen being longer than the other ribbon section and said longer ribbon section being of a length to be wound a whole turn about the platen more than the shorter ribbon section, and means for holding both sections in tension.

17. In a typewriting machine, a platen, a carbon ribbon adapted to be wound about said platen in two sections with the one section superposed upon the other section, the one wound next to the platen being longer than the other ribbon section and said longer ribbon section being of a length to be wound a whole turn about the platen more than the shorter ribbon section, means for holding both sections in tension, and means for predetermining and for maintaining the relative length of said ribbon sections.

In testimony that I claim the foregoing as my invention I affix my signature in the presence of two witnesses, this 30th day of April A. D. 1914.

EDWARD Z. LEWIS.

Witnesses:
 T. H. ALFREDS,
 K. W. DOLL.